US012711552B2

(12) United States Patent
Scavo

(10) Patent No.: US 12,711,552 B2
(45) Date of Patent: Aug. 18, 2026

(54) INTEGRATED INVESTMENT STRATEGY GENERATION AND MANAGEMENT SYSTEM WITH ENHANCED FUNCTIONALITIES

(71) Applicant: Nowcasting.ai, Inc., Palo Alto, CA (US)

(72) Inventor: Damiàn Ariel Scavo, Menlo Park, CA (US)

(73) Assignee: NOWCASTING.AI, INC., Palo Alto, CA (US)

(*) Notice: Subject to any disclaimer, the term of this patent is extended or adjusted under 35 U.S.C. 154(b) by 0 days.

(21) Appl. No.: 18/614,398

(22) Filed: Mar. 22, 2024

(65) Prior Publication Data

US 2024/0346597 A1 Oct. 17, 2024

Related U.S. Application Data

(60) Provisional application No. 63/459,511, filed on Apr. 14, 2023, provisional application No. 63/454,282, filed on Mar. 23, 2023, provisional application No. 63/454,287, filed on Mar. 23, 2023.

(51) Int. Cl.

| | |
|---|---|
| ***G06Q 40/06*** | (2012.01) |
| ***G06F 40/30*** | (2020.01) |
| ***G06Q 30/0201*** | (2023.01) |
| ***G06Q 40/10*** | (2023.01) |

(52) U.S. Cl.

CPC ............ *G06Q 40/06* (2013.01); *G06F 40/30* (2020.01); *G06Q 30/0201* (2013.01); *G06Q 40/10* (2013.01)

(58) Field of Classification Search

None

See application file for complete search history.

(56) References Cited

U.S. PATENT DOCUMENTS

| | | | |
|---|---|---|---|
| 5,790,790 | A | 8/1998 | Smith et al. |
| 5,799,282 | A | 8/1998 | Rakshit et al. |
| 5,819,271 | A | 10/1998 | Mahoney et al. |
| 5,864,871 | A | 1/1999 | Kitain et al. |
| 5,893,079 | A | 4/1999 | Cwenar |
| 6,192,407 | B1 | 2/2001 | Smith et al. |
| 6,484,151 | B1 | 11/2002 | O'Shaughnessy |
| 7,424,517 | B2 | 9/2008 | Dennis |
| 7,451,236 | B2 | 11/2008 | Savitzky et al. |
| 10,909,442 | B1 | 2/2021 | Szarvas et al. |
| 11,367,117 | B1 | 6/2022 | Cheng |

(Continued)

*Primary Examiner* — Narayanswamy Subramanian

(74) *Attorney, Agent, or Firm* — Procopio, Cory, Hargreaves & Savitch LLP

(57) ABSTRACT

A method for generating personalized investment responses comprising receiving, by a processor, input from a user, the input comprising at least one of a text prompt or an audio prompt processing, by the processor, the input using a first artificial intelligence (AI) model to generate extracted information generating, by the processor, a plurality of responses using generative AIs with the extracted information as input; connecting, by the processor, the plurality of responses to real-time market data and exclusive datasets to improve quality and relevance of the plurality of responses; and generating, by the processor, a personalized investment recommendation to the user based on the plurality of responses.

18 Claims, 8 Drawing Sheets

(56) References Cited

U.S. PATENT DOCUMENTS 11,902,177 B1 2/2024 Chakravarty et al.
12,028,177 B1 7/2024 Burke
12,174,841 B2 * 12/2024 Chapman .......... G06F 16/24578
12,277,154 B1 * 4/2025 Khosla ................ G06F 16/3344
12,524,405 B1 * 1/2026 Martini ............. G06F 16/24542
2006/0080599 A1 4/2006 Dubinsky
2007/0294533 A1 12/2007 Toh et al.
2021/0056625 A1 * 2/2021 Kotarinos ......... G06F 16/24578
2021/0264520 A1 * 8/2021 Cummings ............ G06Q 40/06
2022/0237700 A1 7/2022 Sreenivasan
2023/0403247 A1 12/2023 Berry et al.
2024/0070749 A1 2/2024 Chen et al.
2025/0217673 A1 * 7/2025 Silver ....................... G06F 8/30
2025/0322460 A1 * 10/2025 Bjontegard ............ G06Q 40/06

* cited by examiner

INTEGRATED INVESTMENT STRATEGY GENERATION AND MANAGEMENT SYSTEM WITH ENHANCED FUNCTIONALITIES

CROSS-REFERENCE TO RELATED APPLICATIONS

This application claims priority under 35 USC § 119(a) to U.S. Provisional Application No. 63/454,282, filed on Mar. 23, 2023, No. 63/454,287, filed on Mar. 23, 2023, and No. 63/459,511, filed on Apr. 14, 2023, the contents of which are incorporated herein by reference in their entireties.

BACKGROUND

Field

The present invention relates to the field of financial technology, and more particularly to an integrated investment strategy generation and management system leveraging advanced artificial intelligence, real-time market data, and exclusive datasets to deliver personalized investment strategies while incorporating additional functionalities and innovative ideas for an enhanced user experience.

Related Art

Traditional methods of developing investment strategies often require extensive research, specialized knowledge, and significant time investment. Additionally, personal preferences and risk profiles may not be adequately considered in generic investment strategies. In recent years, financial technology has advanced to provide more tailored solutions, but there is still a need for an integrated system that can offer personalized investment strategies while being easy to use and providing a seamless experience.

SUMMARY

The present invention addresses the need for an integrated investment strategy generation and management system by providing a platform that leverages advanced artificial intelligence, real-time market data, and exclusive datasets to deliver personalized investment strategies based on user preferences and risk profiles.

Accordingly, one aspect of the present invention is a method for generating personalized investment strategies comprising the steps of receiving user input in the form of text or audio prompts, processing the input using an AI model such as a multimodal large language model, creating multiple responses using generative AIs, and connecting the responses to real-time market data and exclusive datasets to improve the quality and relevance of the responses.

Aspects of the present application may include a method for generating personalized investment recommendations, the method comprising: receiving, by a processor, input from a user, the input comprising at least one of a text prompt or an audio prompt; processing, by the processor, the input using a first artificial intelligence (AI) model to generate extracted information; generating, by the processor, a plurality of responses using generative AIs with the extracted information as input; connecting, by the processor, the plurality of responses to real-time market data and exclusive datasets to improve quality and relevance of the plurality of responses; and generating, by the processor, a personalized investment recommendation to the user based on the plurality of responses.

Aspects of the present application may include a system for generating personalized investment recommendations, the system comprising: a user device; and a processor external to and in communication wit the user device, the process is configured to: receive input from a user through the user device, the input comprising at least one of a text prompt or an audio prompt; process the input using a first artificial intelligence (AI) model to generate extracted information; generate a plurality of responses using generative AIs with the extracted information as input; connect the plurality of responses to real-time market data and exclusive datasets to improve quality and relevance of the plurality of responses; and generate a personalized investment recommendation to the user based on the plurality of responses.

In another aspect of the present invention, the system takes into account personal factors of the user, such as their risk profile, declared income, place of residence for legal and tax matters, current market conditions, and other relevant factors when generating the responses. The system performs a consistency check on potential responses before selecting the top N responses to present to the user.

In yet another aspect of the present invention, the user can select, modify, or request additional strategies. The platform connects the chosen strategies to its database and generates relevant data such as past performance charts, Greeks (variables used to assess risk in the options market), and other metrics at various maturities. The strategies are saved for future investment purposes, and short and long descriptions are generated for each strategy, which the user can access at any time.

The integrated investment strategy generation and management system may include functionalities, such as support for various asset classes, automatic monitoring and alerts for significant market events, a social-sharing feature, an investment tracking and performance analysis feature, integration with third-party financial institutions, and advanced data security and privacy measures.

The integrated investment strategy generation and management system may further include additional functionalities, such as AI-driven investment advisory, sentiment analysis integration, tax optimization, gamification, customizable risk scenarios, virtual portfolio simulations, machine learning/artificial intelligence model customization, robo-advisory integration, social investing, and education and learning resources.

BRIEF DESCRIPTION OF DRAWINGS

A general architecture that implements the various features of the disclosure will now be described with reference to the drawings. The drawings and the associated descriptions are provided to illustrate example implementations of the disclosure and not to limit the scope of the disclosure. Throughout the drawings, reference numbers are reused to indicate correspondence between referenced elements.

DETAILED DESCRIPTION

Figure 1:
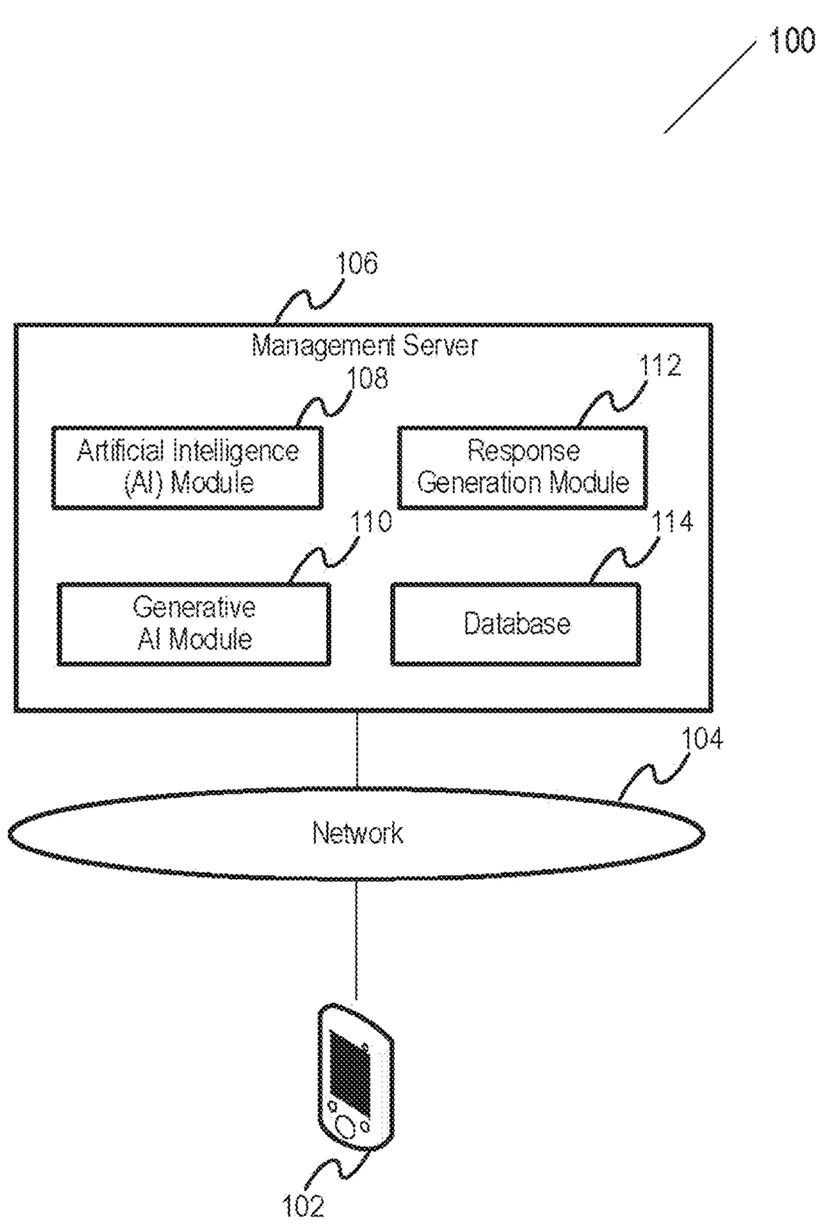
FIG. 1 illustrates an example integrated investment strategy generation and management system, in accordance with an example implementation.

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of the ordinary skills in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

Example implementations relate to an integrated investment strategy generation and management system that combines artificial intelligence, data analytics, and user-centric features to provide personalized investment strategies and resources for users. The system incorporates an AI-driven investment advisor that creates tailored investment strategies based on user preferences, financial goals, and risk tolerance. Sentiment analysis capabilities are integrated to analyze news articles, social media posts, and other relevant sources to gauge market sentiment and predict potential market trends. A tax optimization feature considers the user's tax situation when generating investment strategies. Gamification elements, such as rewards, leaderboards, and badges, are incorporated to motivate users to engage with the platform and learn about investing. Users can create and test customizable risk scenarios and simulate virtual portfolios to better understand the potential impact of different market conditions on their investment strategies. The system enables users to customize machine learning models, integrate with existing robo-advisory platforms, and collaborate, discuss, and share their investment strategies with other users through a social investing feature. Additionally, the system provides a library of educational resources to help users improve their understanding of investing concepts and develop their investment skills.

FIG. 1 illustrates an example integrated investment strategy generation and management system 100, in accordance with an example implementation. As illustrated in FIG. 1, the integrated investment strategy generation and management system 100 may include a user device 102 and a management server 106. The user device 102 communicates with the management server 106 through a network 104. Network 104 can be any network or combination of networks (e.g. internet, local area network, wide area network, telephonic network, cellular network, satellite network, etc.)

Figures 5A, 5B:
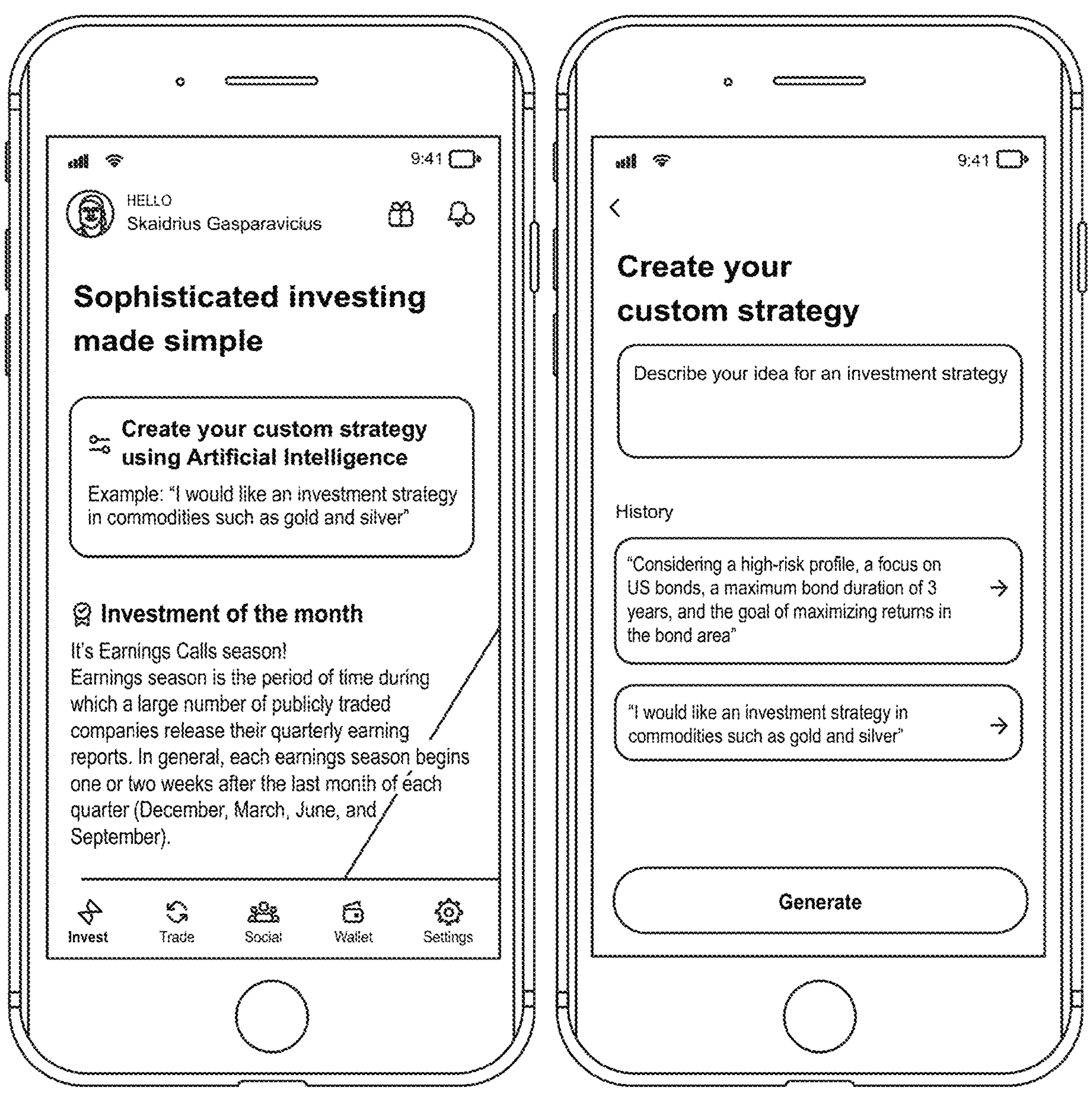
FIGS. 5(A), 5(B), 5(C), and 5(D) illustrate example user interface displays, in accordance with an example implementation.
Figure 5C:
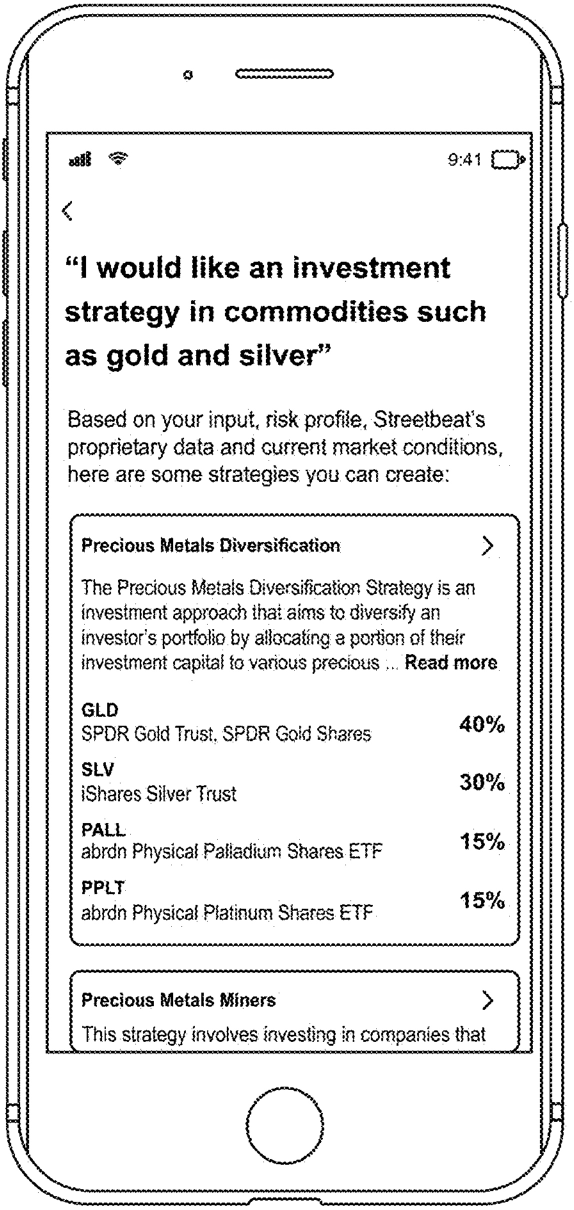
Figure 5D:
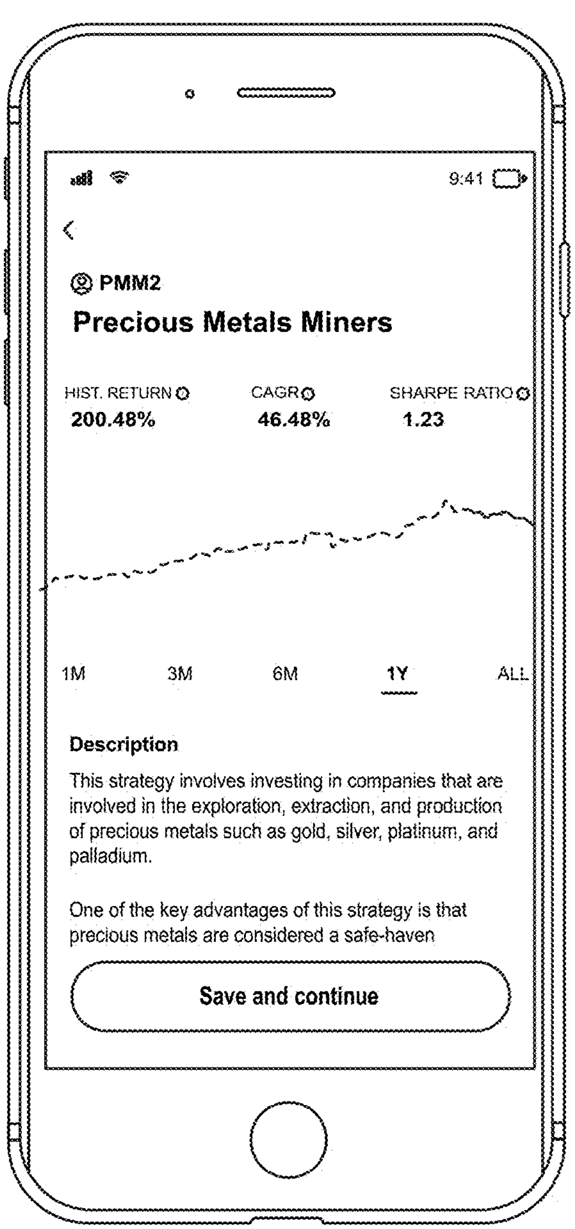

The user device 102 may receive input/request from a user for generation of investment strategies through a graphical user interface (GUI). In some example implementations, the user may enter user preferences, user settings, and risk levels into the user device 102, which will then be used in strategy formulation. FIGS. 5(A)-(D) illustrate example user interface displays as shown on a user device 102, in accordance with an example implementation. As illustrated in FIG. 5(B), custom investment strategies/responses may be generated based on the request entered by the user. The user interface may also display the responses generated from the management server 106 as shown in FIGS. 5(C) and 5(D). Examples of user device 102 may include, but not limited to mobile devices (e.g., smartphones, devices in vehicle and other machine, tablets, notebooks, laptops, personal computers, etc.), and devices not designed for mobility (e.g., desktop computers, information kiosks, televisions, etc.).

The management server 106 received the user input/request from the user device 102 through the network 104. The management server 106 may include components such as, but not limited to, an artificial intelligence (AI) module 108, a generative AI module 110, a response generation module 112, and database 114. The AI module 108 performs information extraction using a trained AI model to interpret user input received from the user device 102. The AI model may include, but not limited to, recurrent neural network (RNN), deep RNN (DRNN), Q-learning network (QN), deep Q-learning network (DQN), etc. RNN may include long short-term memory (LSTM), etc. In some example implementations, the AI model is a large multimodal language model that works with different types of input data, such as text, images, audio, video, etc. The management server 106 alone by itself or in conjunction with other components or servers may form a platform.

The generative AI module 110 performs strategy/response generation using the information extracted by the AI module 108. The generative AI module 110 may utilize any one or combination of a variety of different models in generating strategies/responses, including but not limited to generative adversarial networks (GANs), variational auto-encoders (VAEs), auto-regressive models, transformers, etc. The AI module is iteratively trained using historical data as training input and training parameters are adjusted to generate optimal results.

In some example implementations, distributed computing may be performed to generate investment strategies/responses at user devices 102. Specifically, a number of user devices 102 may be utilized to perform distributed computing when management server 106's resources are exhausted and causing it to be overloaded. The number of user devices 102 may be used to generate investment strategies/responses locally when generative AI is installed or accessed, and providing the generated investment strategies/responses to the requesting user device 102. Permission of the user may be needed before the number of user devices 102 can access information pertaining to request for investment strategies/responses.

The response generation module 112 then utilizes one or more AIs to evaluate the consistency between the responses generated from the generative AI module 110. The response generation module 112 may utilize any of recurrent neural network (RNN), deep RNN (DRNN), Q-learning network (QN), deep Q-learning network (DQN), etc., in performing consistency evaluation. Database 114 stores information pertaining to operations of various components of the management server 106, which may include information such as, but not limited to, exclusive datasets, proprietary data, real-time market data, investment strategies/responses, user preferences, user settings, risk levels, etc.

The integrated investment strategy generation and management system 100 may include additional functionalities to further enhance the user experience, increase personalization, and improve investment performance. Such functionalities may include:

A. AI-driven Investment Advisor: The integrated investment strategy generation and management system 100 incorporates an AI-driven investment advisor that provides personalized investment advice based on user preferences, financial goals, and risk tolerance. This feature can help users make informed decisions and optimize their investment strategies over time.

B. Sentiment Analysis Integration: The integrated investment strategy generation and management system 100 integrates sentiment analysis capabilities, which analyze news articles, social media posts, and other relevant sources to gauge market sentiment and predict potential market trends. This feature allows users to make more informed investment decisions by taking into consideration the prevailing market sentiment. Sentiment information as generated from the analysis may be combined with strategies/responses derived from the generative AI module 110 in generating a personalized investment recommendation.

C. Tax Optimization: The integrated investment strategy generation and management system 100 includes a tax optimization feature that takes into account the user's tax situation when generating investment strategies. The feature provides recommendations on tax-efficient investment vehicles and strategies to help users minimize their tax liabilities. This is performed by analyzing the strategies/responses derived from the generative AI module 110 in conjunction with tax information of the user. Such tax information may include place of domicile for tax rate assessment, filing status, tax bracket level, investment type, investment holding periods, etc. In some example implementations, information pertaining to available investment (e.g., investment type, investment holding periods, etc.) may also be taken into account in deriving investment strategies.

D. Gamification: The integrated investment strategy generation and management system 100 introduces gamification elements, such as rewards, leaderboards, and badges, to motivate users to engage with the platform, learn about investing, and improve their investment performance. This feature is described in more detail below.

E. Customizable Risk Scenarios: The integrated investment strategy generation and management system 100 allows users to create and test customizable risk scenarios, enabling them to better understand the potential impact of different market conditions on their investment strategies.

F. Virtual Portfolio Simulations: The integrated investment strategy generation and management system 100 provides a feature that allows users to create and simulate virtual portfolios, enabling them to test various investment strategies and asset allocations without committing real capital.

G. Machine Learning Model Customization: The integrated investment strategy generation and management system 100 enables users to customize the underlying machine learning models by adjusting parameters, such as risk tolerance and investment horizon, to better align the generated investment strategies with their specific needs.

H. Integration with Robo-advisory Platforms: The integrated investment strategy generation and management system 100 can integrate with existing robo-advisory platforms, allowing users to implement their personalized investment strategies automatically through these platforms. This feature is described in more detail below.

I. Social Investing: The integrated investment strategy generation and management system 100 incorporates a social investing feature that enables users to collaborate, discuss, and share their investment strategies with other users, fostering a community-driven approach to investing. This feature is described in more detail below.

J. Education and Learning Resources: The integrated investment strategy generation and management system 100 includes a library of educational resources, such as articles, videos, and tutorials, that help users improve their understanding of investing concepts and develop their investment skills. In some example implementations, the library of education resources is stored in the database 114 and retrieved on user request.

Figure 2:
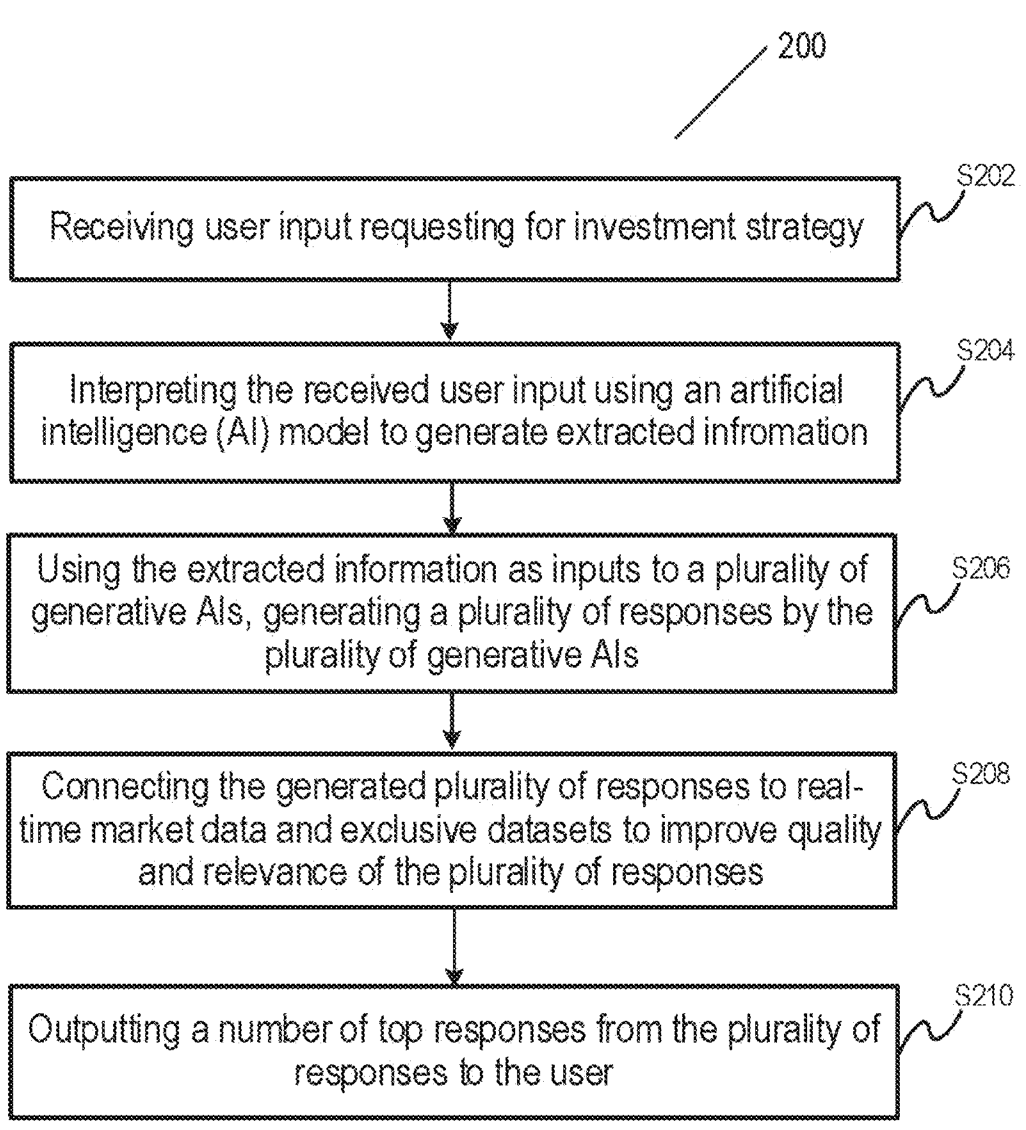
FIG. 2 illustrates an example process flow for generating personalized investment strategies, in accordance with an example implementation.

FIG. 2 illustrates an example process flow 200 for generating personalized investment strategies, in accordance with an example implementation. As illustrated in FIG. 2, the process flow 200 begins at step S202, where user input requesting for investment strategy is received. User input may be in the form of text or audio prompts requesting an investment strategy, for example, an invest strategy request that focuses on commodities such as gold and silver. At step S204, the received user input is interpreted using an artificial intelligence (AI) model to generate extracted information. The AI model is trained using historical data as training input and deployed to extract information from user input.

At step S206, the extracted information is used as input to a plurality of generative AIs to generate a plurality of responses. Generative AIs produce new contents or responses with textual inputs using neural network techniques such as, but not limited to, auto-regressive models, transformers, Generative Adversarial Networks (GANs), Variational Autoencoders (VAEs), etc. The plurality of responses is then connected to real-time market data and exclusive datasets to improve accuracy, quality, and relevance of the plurality of responses at step S208. The system produces a set of potential responses using the plurality of generative AIs. At this stage, the set of potential responses is not shown/revealed to the user. Subsequently, the system copies some of the responses and performs ambiguous modification to the copied responses to prepare for a consistency check. In some example implementations, responses selected for copying are randomly selected. The system will then use one or more AIs to evaluate the consistency between the given responses. In generating the responses, personal factors of the user will be taken into account, such as their risk profile, declared income, place of residence for legal and tax matters (e.g., Europeans cannot invest in American exchange-traded funds (ETFs) unless the ETFs are registered in a specific register required by the European community), current market conditions, and/or other factors that may be important for the decision-making process. Exclusive datasets such as credit card data, financial analyst opinions, satellite and GPS data, and other alternative data sets may be used to improve the quality of the response. Optionally, generation of the plurality of response may be performed using distributed computing. The system then outputs a predetermined number N of top responses to present to the user at step S210. In some example implementations, selection of the N top responses is performed by scoring (e.g., based on accuracy, etc.) the responses and selecting the predetermined number N of top responses based on the scores.

Figure 3:
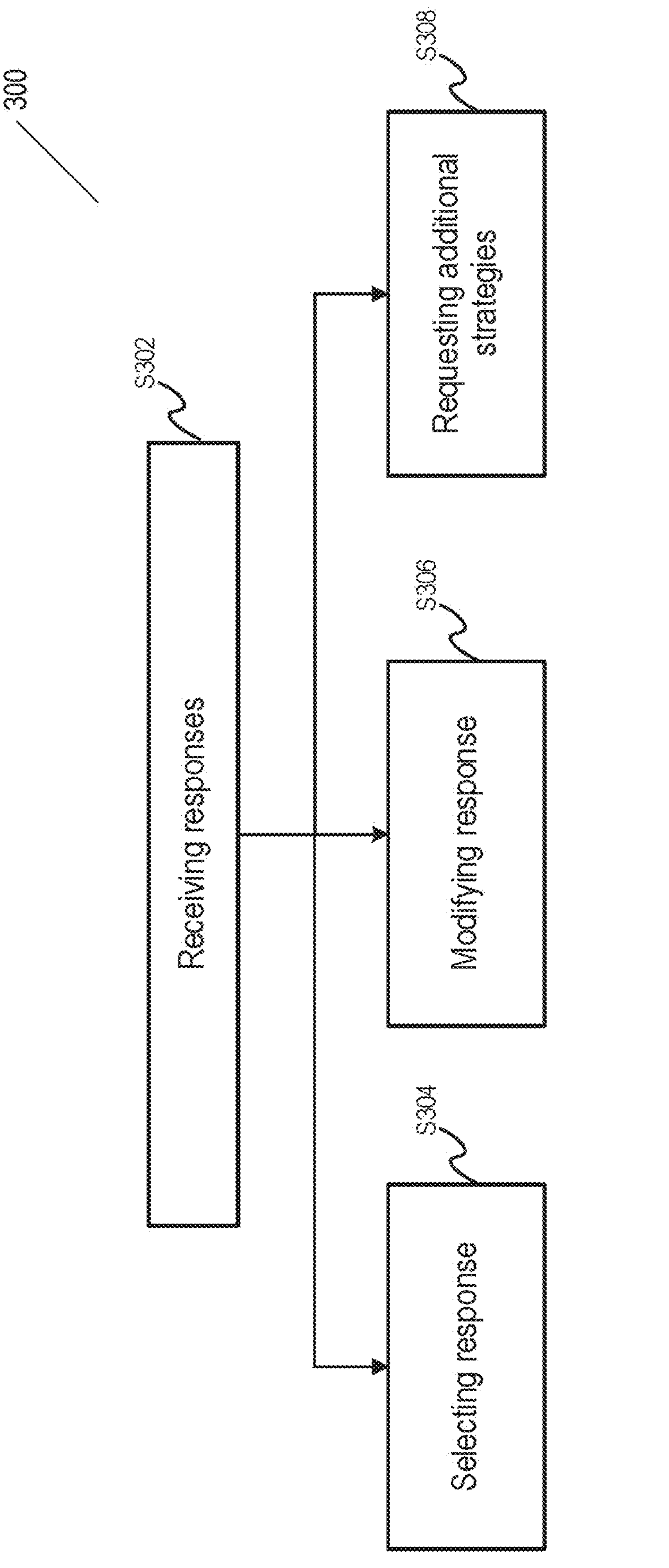
FIG. 3 illustrates an example process flow for selecting, modifying, and saving investment strategies, in accordance with an example implementation.

FIG. 3 illustrates an example process flow 300 for selecting, modifying, and saving investment strategies, in accordance with an example implementation. Upon receiving the generated responses, the generated responses are displayed on the user device 102 and the user can select, modify, or request for additional strategies/responses. As illustrated in FIG. 3, the process begins at step S302, where the user receives the strategy responses generated in FIG. 2. The user may choose to perform anyone one of three actions of response selection (step S304), response modification (step S306), or additional strategy request (step S308).

For example, the system may ask, "which of these strategies would you like to save or invest in, and how much?" The user may respond in turn by entering the user's selection (s) through the user device 102. For example, the user may verbally respond to the responses through the user device 102 by saying "I would like to save all of them and invest $5,000 in strategy 1 and strategy 2. I would also like to modify strategy 3 by removing WPM and adding SLV" into a microphone of the user device 102.

The system then assigns an ID to each strategy, saves the strategies with the requested modifications, verifies the availability of resources (e.g., to invest in the strategies), and allocate the user-specified capital to the chosen strategies. The user can manage and view all generated strategies, modify and delete them using various user interfaces. Once the user chooses/selects the desired strategies, the platform/server will connect them to its database to generate all related data, including past performance charts at various maturities (e.g., 5 days, 1 month, 6 months, 1 year, etc.) and the Greeks for risk measurement at various maturities. The Greeks are variables used in assessing risk in the options market and include the four words of delta, gamma, theta, and vega. Each of the four Greek words represents a degree of risk.

The strategies ultimately accepted by the user will be saved for future investment purposes. In some example implementations, a summary and/or a detailed description may be generated for each strategy, which the user can access at any time. The strategies will then be provided to the platform/server, which will manage and treat the strategies as a basket of securities for the user. In some example implementations, the system may include gamification elements that allow users to share the selected and/or modified strategies with other users, who can copy the strategies for their own investment execution and pay the user a commission/reward through the platform/server for strategy sharing. The commission/rewards may take the form of cash back, discount codes, access to a locked functionality of the platform/server, lottery tickets, direct money back on a debit card or via a peer-to-peer mobile application, gift card, etc. In some example implementations, points are earned instead of or in conjunction with the commission/rewards. The amount of commission/rewards or points received by a sharing user may change based on the amount of capital contributed by other users to the shared strategies. In some example implementations, leaderboards and badges are utilized to track learning progress or points/levels earned. For example, points may be earned based on performance of the strategies/recommendations accepted by users. Points may be aggregated on a portfolio level for each user, with portfolios of users ranked based on performance/points earned. Leaderboards and badges allow users to to engage with the platform, learn about investing, and further improve their investment performance.

In some example implementations, if the user has included, in his or her user settings, a default setting to immediately execute the order based on chosen strategy/response, then the order will be submitted as soon as the user makes selection (e.g., single user selection/action on the user device 102, etc.) without delay. Once the selection is made, the order can then be placed automatically without further user input or review. In alternate example implementation, the order may be executed across a time period, such as the business day. According to one example implementation, a user may include in his or her user preferences, a default setting to make a purchase for a prescribed amount, such as $1 million, at even intervals over the course of the day.

Optionally, the default setting may allow the user to adjust the proportion of orders over the course of the day to be at uneven intervals; for example, as closely bunched at 20-minute intervals during a certain part of the day, spread out over longer intervals of one or two hours during another part of the day, etc. Also optionally, the default setting may allow the user to adjust the amount of each order to be even over the course of a day, such that the amount of investment is frontloaded towards the beginning of the day and gradually decreasing over the course of the day, backloaded to the end of the day and gradually increasing over the course of the day, matching to a profile curve defined by the user; matching to a prediction of an increase or decrease in the stock price at the next interval; or other user determined default setting.

Similarly, the user settings may provide an order limit in the default, such that if the price exceeds a price limit, the order is no longer executed for the rest of the day. Thus, according to one example implementation, if a user selects "yes" to purchase $1000 of a stock divided evenly over five hours, with a $200 order being placed every hour, and the stock price then exceeds the limit price during the third hour, then the fourth hour order of $200 will not be executed if the stock price continues to exceed the limit price. Similarly, at the fifth hour, if the stock price exceeds the limit price, that fifth hour order will not be placed.

With respect to the execution of the order, the user may provide, in the default settings, one or more default service providers, such as one or more brokers/robo-advisory platforms to automatically execute the order. Further, the user may provide one or more stock exchanges upon which to execute the order. The user may specify a percentage of an overall order to be placed with each of the one or more brokers that is even, uneven, or proportionally divided automatically based on past performance relative to past strategies/responses.

As for the order size, the user default setting may provide for a predetermined order size, such as 100 shares, or a predetermined amount, such as $1000 worth of shares. Thus, the user need not specify the number of shares; the amount of the shares; which broker or brokers or stock exchanges to contact; the timing of the order placement and execution; the proportionality or evenness of the timing or amounts over a time, because those parameters are already determined based on the previously provided user settings. Accordingly, the user only needs to select "yes" or "no" (e.g., as appeared on the user device 102), to execute the order according to the default user settings as previously determined by the user.

In some example implementations, the user may receive one or more strategies/responses in the form of push notification. In addition to a one-to-one relationship between the user action and the trade execution, the user may be provided with an option to execute all of the multiple push notifications that are provided together, with a single decision, by selecting an option such as "yes to all". If such an option is selected, then all of the orders will be executed according to the predefined user preferences as explained above.

The foregoing example implementations may provide a push notification by modes known to those skilled in the art. For example, but not by way of limitation, the push notification may be provided by email, text message or SMS (short message service), chat via online social networking service, etc. Further, the push notification may be provided not just in a visual presentation, but alternatively or conjunctively as an audio message, such as by a speaker in a home device, such as AMAZON ALEXA or the like.

Further, the foregoing example implementations may provide the option of performing order execution during transport, such as to a driver receiving the signals via a telecommunications network including but not limited to a 5G network. Thus, the driver, by audio communication with a speaker and microphone or other input/output devices that would be understood by those skilled in the art, may execute, by a single voice command, the instruction to execute the order as explained above. Similarly, a passenger may also use the system. Thus, the example implementations may provide for hands-free order placement.

Additionally, while the example implementations may be implemented on a mobile communication device such as a smart phone, the example implementations are not limited thereto. For example, but not by way of limitation, the user settings may provide the user with control over the single action purchase modes, so as to require the user to join from an authenticated device, such as by requiring two factor authentication prior to accessing the strategies/responses, or the push notifications, or to provide a privacy preserving aspect, such that other form of authentication, such as login, biometric, second factor, or other aspect is required to receive the push notification. Similarly, in place of the user providing an audio response or selecting a specific option on a screen, the user may instead use gestures, signals, or other biometrics to indicate a decision.

For example, but not way of limitation, the user may determine that, in the user settings, if the first finger is placed on a fingerprint detector associated with the user device 102, then the user is indicating that the order should be executed in accordance with the strategy/response provided; whereas, if a finger other than the first finger is placed on a fingerprint detector, then the user is indicating that the order should not be executed. Such an example implementation would allow the user to make his or her decision in the presence of other individuals who, although they may be able to hear or see the user interface, cannot understand whether the single action of the user is a decision to execute the order not to execute the order. While the foregoing example refers to a fingerprint, other gesture or user signal as defined in the user settings may be employed. Similarly, a voice command other than "yes" or "no" may also be used, so as to prevent a third party from knowing what the user has decided to do simply based on hearing the audio response of the user. Thus, the privacy of the user is protected in circumstances where the user interface can be seen or heard by others.

In terms of hardware, the foregoing example implementations may be implemented in a client device such as a smart phone, laptop or the like. Further, and as also explained herein, the foregoing example implementations may be integrated with other devices, such as a device, a processor and memory of an automobile or other vehicle, or other device as would be understood by those skilled in the art. The foregoing user experiences may be provided by the user in a "user setting" aspect of an online application as parameters that are input by text entry, radio button, checkbox, slider or other visual manner of user input and user output as would be understood by those skilled in the art.

The example implementations described herein may be executed in the form of machine-readable executable instructions stored in a memory, which are configured to access the predefined user settings, which may be stored, such as in the database 114, either locally or remotely in the cloud for example, such that the user settings may be accessed by one or more devices as are authorized by the user to execute the instructions. Instructions may also be provided in the form of an online user application.

Before the foregoing example implementations are executed to provide the push notification, the user must enter the default user settings. When the online application is installed, a default series of settings may be provided based on a profile of information associated with the user. For example, but not by way of limitation, if the user self identifies their risk level as high, medium or low, then a default setting may be selected from a corresponding set of predefined profiles, based on aggregated information of other users in association with their risk profiles, to match the default setting of the user with an average default setting for other users having a similar risk profile. Factors other than the risk may be used to determine the default settings.

Additionally, the user may have multiple default settings, and different default settings may be applied depending on different user situations that may be automatically accessed by the online application. For example, but not by way of limitation, if the online application is aware that the available cash funds of a user in their bank accounts exceeds a prescribed level, the default settings may be set to one of the default settings in which the amounts, frequency, price limit or other aspect of the user settings are adjusted to account for an increased availability of investment funds, or an increased risk profile.

Optionally, a user may adjust the settings depending on a date for time, such as before or after earnings announcements, start/end of fiscal year, or other critical timing as would be understood by those skilled in the art. Similarly, the timing may be based on a condition of the user, such as after employer payday, after monthly debt payment such as mortgage, credit card, etc. Similarly, the user may be prompted to select a change among the default settings based on a change in the user's financial situation, such as new job, layoff, major purchase such as home or vehicle, vacation, or other financial event. Thus, the user's selection of a default setting may be partially or completely supported, or automated. Alternatively, instead of inputting one or more user settings, the user may generate a rule base that is applied to the user settings, or that is applied directly to the "yes" decision on a push notification.

Figure 7:
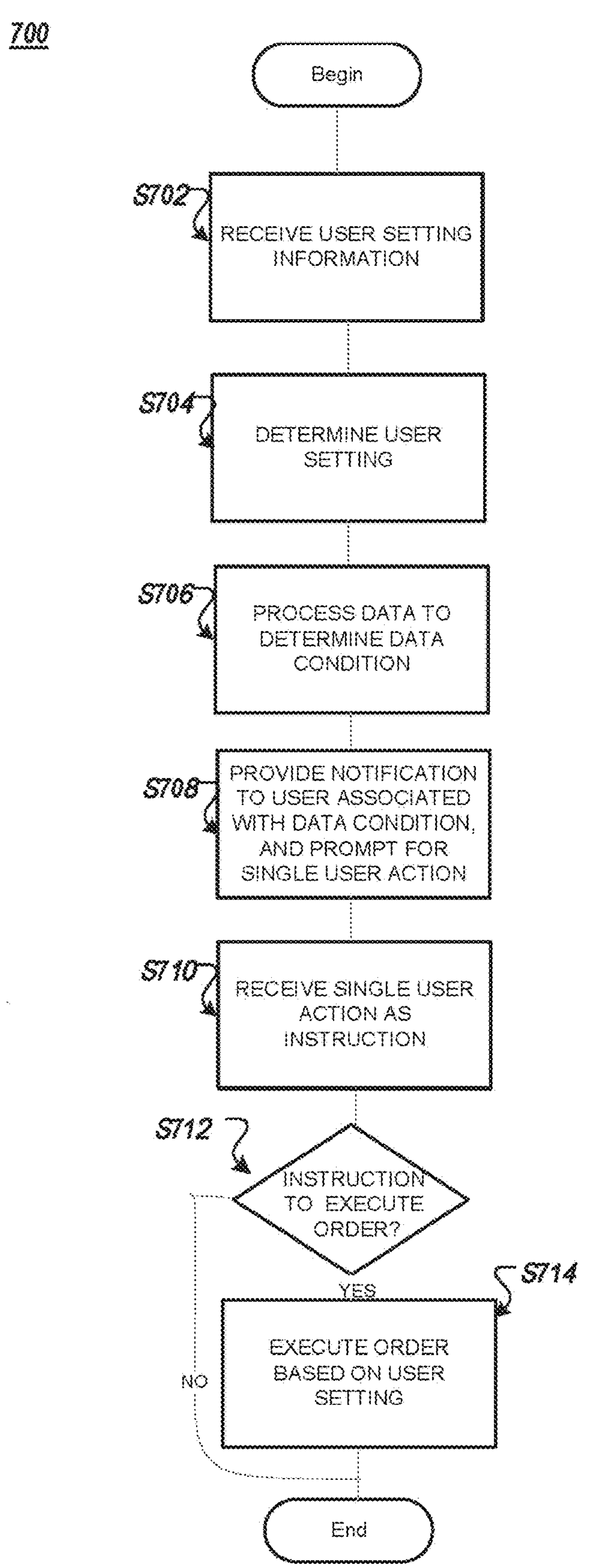
FIG. 7 illustrates an example process 700 directed to execution of an order based on a single user action, in accordance with an example implementation.

The integrated investment strategy generation and management system 100 integrates with third-party financial institutions to allow for seamless execution of investment strategies within the platform. FIG. 7 illustrates an example process 700 associated with the foregoing example implementations. More specifically, the example process 700 is directed to execution of an order based on a single user action, wherein the order is based on a received strategy/response.

At step S702, information that is associated with a user is received as user setting information. For example, but not by way of limitation, as explained above, information associated with a user's profile, such as preferences, risk information, financial information, demographic information or other information that is associated with the user is received through user input (e.g., through user device 102, online application, etc.). At step S704, the user setting is determined. More specifically, the user setting information received from the user at step S702 is assembled and stored, such as in the database 114, as a series of user preferences, thresholds, parameters, etc. Further, and as explained above, additional support tools or automated processes for determining a user setting, such as current time of a time period, such as end of quarter, end of year, payday, before or after major purchase event, or the like, may be taken into account. As an outcome of step S704, the user setting is stored in a machine-readable form such that it can be accessed and applied in response/strategy generation, so as to provide the necessary instructions or execution of the order associated with the response/strategy without requiring any user input.

At step S706, the example implementations perform processing of the data to determine a data condition. More specifically, as explained above, a plurality of alternate data inputs of different types are processed and normalized, and applied to a series of operations in order to generate a forecast or an expected value, or a recommendation. Further, the recommendation, forecast or expected value may also have an associated degree of confidence. Thus, the data condition is generated, including the forecast, expected value or recommendation, as compared with predicted information, such as expected quarterly earnings, and a degree of confidence associated with the recommendation, forecast or expected value.

At step S708, the data condition is provided to the user in the form of a push notification, such as SMS, email or the like, as explained above. Further, the user is prompted for a single user action, such as "yes" or "no". The user must determine only whether to execute an order based on the provided data condition. The information at step S708 is provided to the user via a user interface on the user device 102, which as explained above may include, but is not limited to, visual and audio inputs.

At step S710, a single user instruction is received. The single-user instruction is based on a single user action. For example, but not by way of limitation, the single-user action is the user selecting "yes" or "no". This may be done, as explained above by visual or audio input to the user device 102, which may include a mobile phone, a laptop, etc., as also explained above. At step S712, a determination is made as to the instruction associated with the single-user action. For example, but not by way of limitation, it is determined whether the single user action is to execute the order or not execute the order. If the operation at step S712 determines that the single user action is an instruction to not execute the order, the processterminates.

On the other hand, if the single user action is determined to be an instruction to execute the order, then at step S714, the order is executed based on the user setting that was determined at step S704. More specifically, the user setting provides information that is, including but not limited to, whether the order is executed immediately or at a later time; whether the order is executed as a single transaction or a plurality of transactions; whether, if a plurality of transactions is requested; whether the timing and amount are evenly or unevenly distributed over the course of a day or other time period; and whether there are any price limits or other limits, or patterns in the case of an uneven distribution over the course of the day or other time period, and identity of one or more brokers or markets that constitute service providers, or other user settings as explained above. Thus, the order is executed based on a single user action, in association with the user settings.

Step S714 may further include performance of an update to the user portfolio, so as to indicate that the order has been executed. Optionally, the user may be provided with a report via the communication or distribution channels explained above, to confirm that the order was executed, to provide an update of the portfolio, and/or to remind the user of any pending or open orders.

External data fetching according to the example implementations described herein may be performed by copying data from an external third party (e.g., vendor), and storing the data in a cloud storage container. The data fetching process may be managed by a scheduling server, and/or a serverless compute service that executes operations to manage the external data storage and the associated compute resources. Further, the extraction, transformation and loading of data as described herein may be executed by a batch management processor or service. Batch computing is the execution of a series of executable instructions ("jobs") on one or more processors without manual intervention by a user, e.g., automatically. Input parameters may be predefined through scripts, command-line arguments, control files, or job control language. A batch job may be associated with completion of preceding jobs, or the availability of certain inputs. Thus, the sequencing and scheduling of multiple jobs is critical. Optionally, batch processing may not be performed with interactive processing. For example, the batch management processor or service may permit a user to create a job queue and job definition, and then to execute the job definition and review the results. According to an example implementation, a batch cluster includes 256 CPUs, and an ETL-dedicated server having 64 cores and 312 GB of RAM. The number of running instances may be 1. The foregoing ETL infrastructure may also be applied to the process of insight extraction. Further, an API is provided for data access. For example, but not by way of limitation, the REST API, which conforms to a REST style architecture and allows for interaction with RESTful resources, may be executed on a service. The service may include, but is not limited to, hardware such as 1 vCPU, 2 GB RAM, 10 GB SSD disk, and a minimum of two running instances. The API may be exposed to the Internet via an online application load balancer, which is elastic and permits configuration and routing of an incoming end-user to online applications based in the cloud, optionally pushing traffic across multiple targets in multiple availability zones. The caching layer may be provided by a fast content delivery network (CDN) service, which may securely deliver the data described herein with low latency and high transfer speeds. According to the example implementations, containers may be run without having to manage servers or clusters of instances, such that there is no need to provision, configure, or scale clusters on virtual machines to execute operations associated with containers.

The system connects the chosen strategies to its database and generates relevant data such as past performance charts, Greeks, and other metrics at various maturities. The strategies are then saved for future investment purposes, and short and long descriptions are generated for each strategy, which the user can access at any time.

The integrated investment strategy generation and management system 100 may support various asset classes, including stocks, exchange-traded funds (ETFs), futures, cryptocurrencies, blockchain-based assets, etc. The recommendation or generated responses may be associated with any one or more of asset classes of stocks, exchange-traded funds (ETFs), futures, cryptocurrencies, blockchain-based assets, etc. In addition, the integrated investment strategy generation and management system 100 performs automatic monitoring and alert generation for significant market events or changes that may impact the user's investment strategies (e.g., events having market-wide impacts, news updates pertaining to current portfolio or company of interest, etc.).

In some example implementations, the integrated investment strategy generation and management system 100 provides a social-sharing feature that allows users to share their strategies/responses with others. The strategy recipients may then copy the shared strategies/responses and issue a commission to the user for sharing the strategies/responses through the integrated investment strategy generation and management system 100. Receipt or issuance of commissions by users is controlled by the integrated investment strategy generation and management system 100.

As described above, the integrated investment strategy generation and management system 100 also provides an investment tracking and performance analysis feature that enables users to monitor the performance of their chosen strategies over time and adjust as needed. In some example implementations, strategy adjustment is performed automatically or based on user's preferences as found in user settings. For example, adjustment may be performed according to a predetermined time interval (e.g., every week, every month, etc.). Adjustment may also be triggered based on tracked performance level of the chosen strategy.

The integrated investment strategy generation and management system 100 also provides advanced data security and privacy measures to protect users' personal information and investment details. The integrated investment strategy generation and management system 100 performs data processing that is compliant with various data privacy regulations, guidelines, or laws (e.g, general data protection regulation (GDPR), California Consumer Privacy Act (CCPA), etc.).

Upon submitting at least one of a text or audio prompt (e.g., through the user device 102, through an online application, website, etc.), the user has the ability to request an investment strategy from the management server/platform. For example, the user may input the command of "I would like an investment strategy in commodities such as gold and silver" on the user device 102. The system will then process the request as described below and report the generated responses/result. As, for example, the following: "Here are four investment strategies in commodities related to your investment profile:

Precious Metals Diversification Strategy:
- ETFs: SPDR Gold Trust (GLD), iShares Silver Trust (SLV), Aberdeen Standard Physical Palladium Shares ETF (PALL), and Aberdeen Standard Physical Platinum Shares ETF (PPLT). Allocation: 40% GLD, 30% SLV, 15% PALL, 15% PPLT.

Precious Metals Miners Strategy:
- Stocks: Invest in mining companies such as Barrick Gold Corporation (GOLD), Newmont Corporation (NEM), Wheaton Precious Metals Corp (WPM), and Sibanye-Stillwater Limited (SBSW). ETFs: VanEck Vectors Gold Miners ETF (GDX) and Global X Silver Miners ETF (SIL). Allocation: 60% stocks, 20% GDX, 20% SIL.

Precious Metals Momentum Strategy:
- ETFs: Invest in ETFs with strong recent performance, such as ETFS Physical Swiss Gold Shares (SGOL), iShares Silver Trust (SLV), GraniteShares Platinum Trust (PLTM), and Aberdeen Standard Physical Palladium Shares ETF (PALL). Allocation: 40% SGOL, 30% SLV, 15% PLTM, 15% PALL.

Precious Metals Value Strategy:
- Stocks: Invest in undervalued precious metal mining companies, such as Yamana Gold Inc. (AUY), Pan American Silver Corp. (PAAS), Impala Platinum Holdings Limited (IMPUY), and Norilsk Nickel (NILSY). ETFs: Global X Gold Explorers ETF (GOEX) and Sprott Junior Gold Miners ETF (SGDJ). Allocation: 60% stocks, 20% GOEX, 20% SGDJ."

In the alternative, responses may also be generated based on commands with different degrees of information. For example, considering a high-risk profile, a focus on US bonds, a maximum bond duration of 3 years, and the goal of maximizing returns in the bond area, the following modified bond strategies can be suggested:

High-Yield Corporate Bond Strategy
- Invest in high-yield corporate bonds with higher credit risk but potentially higher returns. Examples include:
- iShares iBoxx $ High Yield Corporate Bond ETF (HYG) SPDR Bloomberg Barclays High Yield Bond ETF (INK) VanEck Vectors Fallen Angel High Yield Bond ETF (ANGL) iShares Broad USD High Yield Corporate Bond ETF (USHY) Xtrackers USD High Yield Corporate Bond ETF (HYLB) Allocation: 20% HYG, 20% INK, 20% ANGL, 20% USHY, 20% HYLB.

Bank Loan Bond Strategy:
- Invest in bank loan bonds, which typically have floating interest rates and are senior in the capital structure. This may provide higher returns in a rising interest rate environment. Consider:
- Invesco Senior Loan ETF (BKLN)
- SPDR Blackstone/GSO Senior Loan ETF (SRLN)
- First Trust Senior Loan Fund (FTSL)
- Highland iBoxx Senior Loan ETF (SNLN)
- VanEck Vectors BDC Income ETF (BIZD)
- Allocation: 20% BKLN, 20% SRLN, 20% FTSL, 20% SNLN, 20% BIZD.

Short-Duration Treasury Bond Strategy:
- Invest in short-duration Treasury bonds, which are less sensitive to interest rate changes and offer potentially higher returns when interest rates decrease. Consider:
- iShares 1-3 Year Treasury Bond ETF (SHY)
- Schwab Short-Term U.S. Treasury ETF (SCHO)
- SPDR Bloomberg Barclays 1-3 Month T-Bill ETF (BIL)
- Vanguard Short-Term Treasury ETF (VGSH)
- First Trust Low Duration Opportunities ETF (LMBS)
- Allocation: 20% SHY, 20% SCHO, 20% BIL, 20% VGSH, 20% LMBS.

Municipal High-Yield Bond Strategy:
- Invest in high-yield municipal bonds, which have higher credit risk but potentially higher returns, while providing potential tax advantages for US investors. Consider:
- VanEck Vectors High-Yield Municipal Index ETF (HYD)
- Invesco High Yield Municipal Bond ETF (HYMB)
- iShares National Muni Bond ETF (MUB)
- SPDR Nuveen Bloomberg Barclays Short Term Municipal Bond ETF (SHM)

iShares Short-Term National Muni Bond ETF (SUB)
Allocation: 20% HYD, 20% HYMB, 20% MUB, 20% SHM, 20% SUB.

In some example implementations, the strategies/responses present back-testing, various expiration charts, parameters such as the Sharp Ratio, Max Drawdown, Alpha, Volatility, and other similar parameters, as well as a potential simulation of future revenue.

The system connects the chosen strategies to its database and generates relevant data such as past performance charts, Greeks, and other metrics at various maturities. The strategies are then saved for future investment purposes, and short and long descriptions are generated for each strategy, which the user can access and review at any time (e.g., displayed on the user device 102 for review, etc.).

Figure 6:
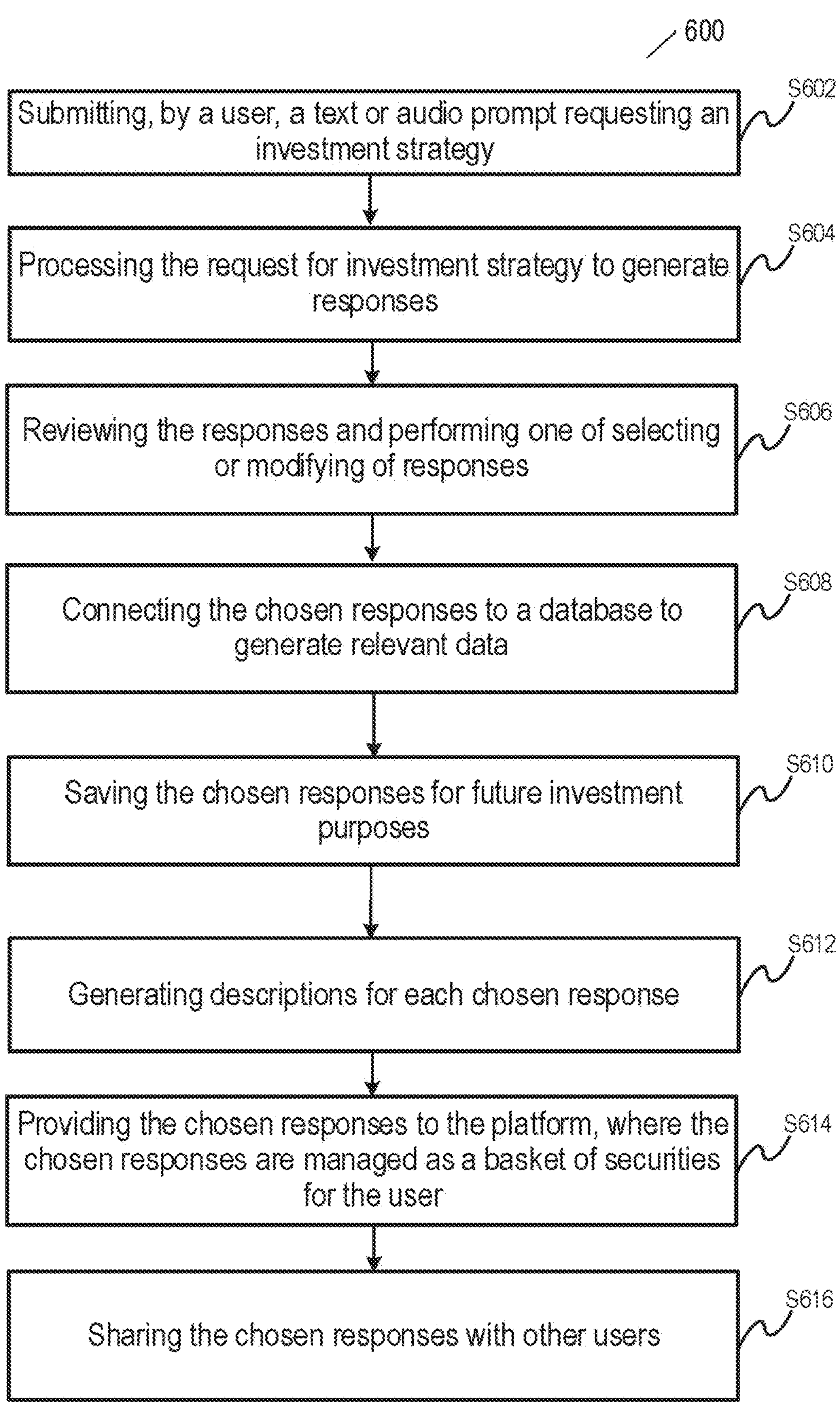
FIG. 6 illustrates an example alternate process flow for generating personalized investment strategies, in accordance with an example implementation.

FIG. 6 illustrates an example alternate process flow 600 for generating personalized investment strategies, in accordance with an example implementation. As illustrated in FIG. 6, the process begins at step S602, where a user submits at least a text or audio prompt requesting an investment strategy. At step S604, the request for investment strategy is processed to generate investment strategies/responses. This is performed by interpreting the user request using an AI model and using generative AIs to create a number of responses. The responses are then connected to real-time market data and exclusive datasets and a consistency check is performed on the responses to select N number of top responses as output to the user.

At step S606, user reviews the generated responses and selects or modifies the strategies/responses. At step S608, the chosen strategies/responses are connected to a database to generate relevant data (e.g., charts, Greeks, etc.). User's chosen strategies/responses are then saved in the database for future investment purposes at step S610. At step S612, descriptions for each chosen response are generated. In some example implementations, both short and long descriptions are generated for each strategy/response. At step S614, the chosen responses are provided to the platform, where the chosen responses are managed as a basket of securities for the user. The user may then share the chosen strategies/responses with other users, who can copy the strategies/responses and, pay a commission through the platform.

The foregoing example implementation may have various benefits and advantages. For example, example implementations offer an integrated investment strategy generation and management system that leverages advanced AI, real-time market data, and exclusive datasets to deliver personalized investment strategies while maintaining a user-friendly interface and a seamless experience. The innovative system allows users to manage their investments efficiently, share strategies with others, and optimize their portfolios based on their unique preferences and risk profiles.

Figure 4:
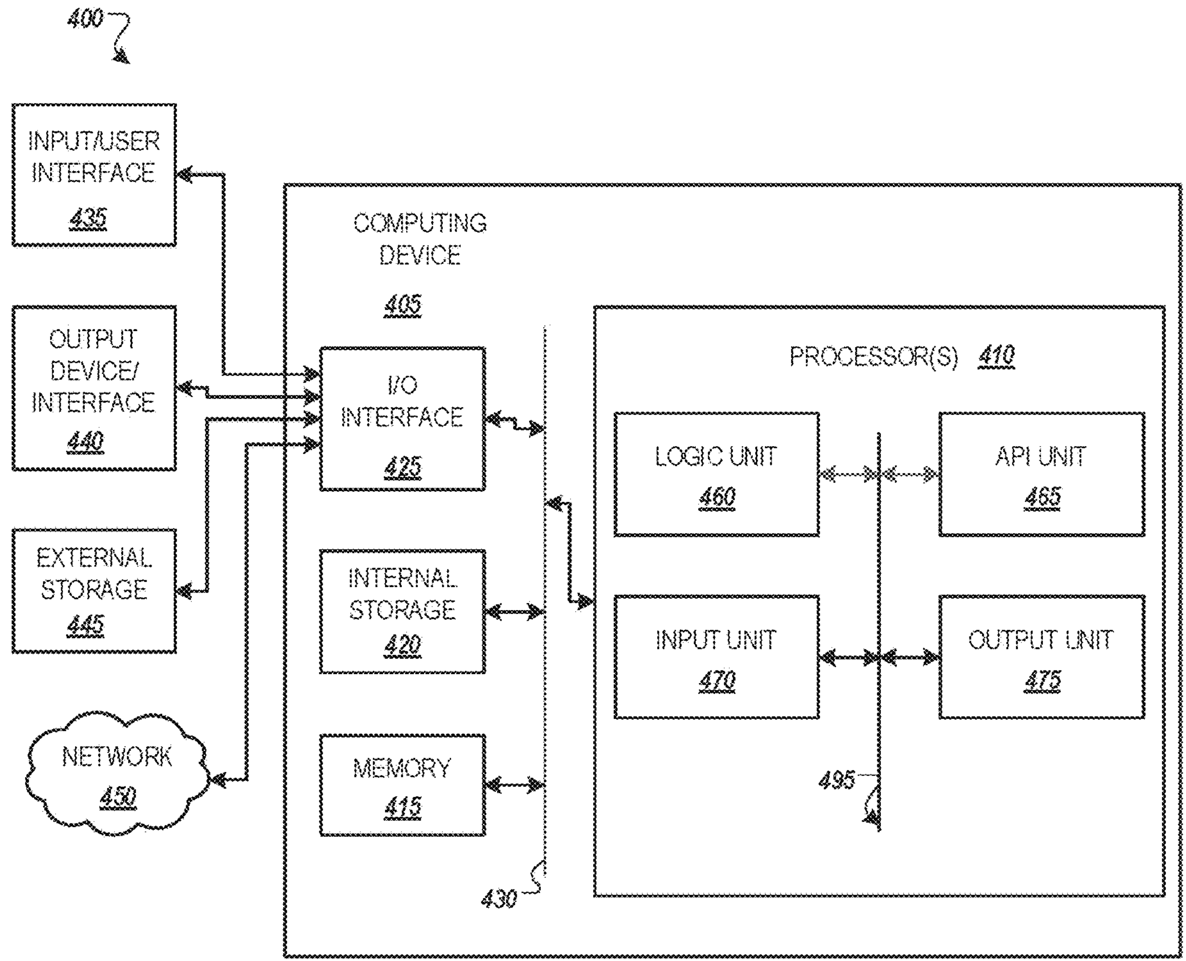
FIG. 4 illustrates an example computing environment with an example computer device suitable for use in some example implementations.

FIG. 4 illustrates an example computing environment with an example computer device suitable for use in some example implementations. Computer device 405 in computing environment 400 can include one or more processing units, cores, or processors 410, memory 415 (e.g., RAM, ROM, and/or the like), internal storage 420 (e.g., magnetic, optical, solid-state storage, and/or organic), and/or IO interface 425, any of which can be coupled on a communication mechanism or bus 430 for communicating information or embedded in the computer device 405. IO interface 425 is also configured to receive images from cameras or provide images to projectors or displays, depending on the desired implementation. Computing environments of user device 102 and management server 106 may be represented by the computing environment of FIG. 4.

Computer device 405 can be communicatively coupled to input/user interface 435 and output device/interface 440. Either one or both of the input/user interface 435 and output device/interface 440 can be a wired or wireless interface and can be detachable. Input/user interface 435 may include any device, component, sensor, or interface, physical or virtual, that can be used to provide input (e.g., buttons, touch-screen interface, keyboard, a pointing/cursor control, microphone, camera, braille, motion sensor, accelerometer, optical reader, and/or the like). Output device/interface 440 may include a display, television, monitor, printer, speaker, braille, or the like. In some example implementations, input/user interface 435 and output device/interface 440 can be embedded with or physically coupled to the computer device 405. In other example implementations, other computer devices may function as or provide the functions of input/user interface 435 and output device/interface 440 for a computer device 405.

Examples of computer device 405 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 405 can be communicatively coupled (e.g., via IO interface 425) to external storage 445 and network 450 for communicating with any number of networked components, devices, and systems, including one or more computer devices of the same or different configuration. Computer device 405 or any connected computer device can be functioning as, providing services of, or referred to as a server, client, thin server, general machine, special-purpose machine, or another label.

IO interface 425 can include, but is not limited to, wired and/or wireless interfaces using any communication or IO protocols or standards (e.g., Ethernet, 802.11x, Universal System Bus, WiMax, modem, a cellular network protocol, and the like) for communicating information to and/or from at least all the connected components, devices, and network in computing environment 400. Network 450 can be any network or combination of networks (e.g., the Internet, local area network, wide area network, a telephonic network, a cellular network, satellite network, and the like).

Computer device 405 can use and/or communicate using computer-usable or computer readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid-state media (e.g., RAM, ROM, flash memory, solid-state storage), and other non-volatile storage or memory.

Computer device 405 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 410 can execute under any operating system (OS) (not shown), in a native or virtual environment. One or more applications can be deployed that include logic unit 460, application programming interface (API) unit 465, input unit 470, output unit 475, and inter-unit communication mechanism 495 for the different units to communicate with each other, with the OS, and with other applications (not shown). The described units and elements can be varied in design, function, configuration, or implementation and are not limited to the descriptions provided. Processor(s) 410 can be in the form of hardware processors such as central processing units (CPUs) or in a combination of hardware and software units.

In some example implementations, when information or an execution instruction is received by API unit 465, it may be communicated to one or more other units (e.g., logic unit 460, input unit 470, output unit 475). In some instances, logic unit 460 may be configured to control the information flow among the units and direct the services provided by API unit 465, the input unit 470, the output unit 475, in some example implementations described above. For example, the flow of one or more processes or implementations may be controlled by logic unit 460 alone or in conjunction with API unit 465. The input unit 470 may be configured to obtain input for the calculations described in the example implementations, and the output unit 475 may be configured to provide an output based on the calculations described in example implementations.

Processor(s) 410 can be configured to receive input from a user, the input comprising at least one of a text or audio prompt as shown in FIGS. 2 and 6. The processor(s) 410 may also be configured to process the input using an artificial intelligence (AI) model to generate extracted information as shown in FIGS. 2 and 6. The processor(s) 410 may also be configured to generate a plurality of responses using generative AIs with the extracted information as input as shown in FIGS. 2 and 6. The processor(s) 410 may also be configured to generate a recommendation based on the plurality of responses as shown in FIGS. 2 and 6.

The processor(s) 410 may also be configured to connect real-time market data and exclusive datasets to the plurality of responses to improve quality and relevant of the plurality of responses as shown in FIG. 2. The processor(s) 410 may also be configured to perform at least one of response selection, response modification, or additional response request in association with the recommendation as shown in FIG. 3.

The processor(s) 410 may also be configured to generate relevant data associated with selected responses as shown in FIGS. 2 and 6. The processor(s) 410 may also be configured to store the selected responses and the relevant data to a database as shown in FIGS. 2 and 6. The processor(s) 410 may also be configured to share the selected responses with other users to enable review and execution of the selected responses by other users as shown in FIG. 6.

The processor(s) 410 may also be configured to generate descriptions for each of the plurality of responses as shown in FIGS. 2 and 6. The processor(s) 410 may also be configured to store the plurality of responses and descriptions for future investment as shown in FIGS. 2 and 6.

The processor(s) 410 may also be configured to display a user prompt to perform a user request in accordance with the recommendation on a user device for the user to select as shown in FIGS. 5(A)-(D). The processor(s) 410 may also be configured to execute the user request in response to a single user input to the user device to select the user prompt as shown in FIGS. 5(A)-(D).

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer readable storage medium or a computer readable signal medium. A computer readable storage medium may involve tangible mediums such as, but not limited to, optical disks, magnetic disks, read-only memories, random access memories, solid-state devices, and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general-purpose computer, based on instructions stored on a computer readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A method for generating personalized investment recommendations, the method comprising:

receiving, by a processor, input from a user, the input comprising at least one of a text prompt or an audio prompt;

processing, by the processor, the input using a first artificial intelligence (AI) model comprising at least one of a recurrent neural network (RNN), deep RNN (DRNN), Q-learning network (QN), or deep Q-learning network (DQN) to generate extracted information, wherein the first AI model transforms unstructured natural language or audio input into a structured representation comprising identified investment intents, risk parameters, and asset class preferences;

generating, by the processor, a plurality of responses using generative AIs with the extracted information as input, wherein the generative AIs are iteratively trained using historical data as training input with training parameters adjusted based on performance feedback, and wherein the iterative training comprises comparing each generative AI's prior outputs against subsequent actual market outcomes to dynamically adjust model weights;

connecting, by the processor, the plurality of responses to real-time market data and exclusive datasets comprising at least one of credit card transaction volumes, satellite imagery data, GPS-derived foot traffic data, financial analyst opinion data, and shipping or supply chain data to improve quality and relevance of the plurality of responses by identifying discrepancies between the generative AI responses and current real-world conditions reflected in the exclusive datasets, and adjusting the responses to account for identified discrepancies;

copying, by the processor, at least some of the plurality of responses and performing modification to the copied responses to prepare for a consistency check;

evaluating, by the processor using one or more AIs, consistency between the plurality of responses and the modified copied responses;

scoring the plurality of responses based on the consistency evaluation;

selecting a predetermined number of top responses based on the scores to present to the user; and generating, by the processor, a personalized investment recommendation to the user based on the plurality of responses, wherein the generative AIs comprise at least one of generative adversarial networks (GANs), variational auto-encoders (VAEs), autoregressive models, or transformers, and wherein the processor is further configured to perform distributed computing across a plurality of user devices to generate the plurality of responses when resources of the processor are exhausted.

2. The method of claim 1, wherein the processor is configured to generate the personalized investment recommendation by further performing:

evaluating, using a second AI model, the plurality of responses based on at least one of user preferences, financial goals, or risk tolerance of the user in generating the personalized investment recommendation.

3. The method of claim 1, wherein the processor is configured to generate the personalized investment recommendation by further performing:

analyzing, by the processor, sentiment information comprising news articles and social media posts to gauge market sentiment and predict potential market trends; and combining, by the processor, the analyzed sentiment information with the plurality of responses to generate the personalized investment recommendation.

4. The method of claim 1, wherein the processor is configured to generate the personalized investment recommendation by:

analyzing the plurality of responses in conjunction with tax information of the user to derive a set of tax minimizing responses; and generating the personalized investment recommendation from the set of tax minimizing responses.

5. The method of claim 1, further comprising:

ranking, by the processor, a plurality of portfolios in a leaderboard, wherein the plurality of portfolios comprises a portfolio of the user derived based on the personalized investment recommendation and portfolios of other users.

6. The method of claim 1, further comprising:

performing, by the processor, virtual portfolio simulations using the plurality of responses for scenario testing.

7. The method of claim 1, further comprising:

displaying a user prompt to perform a user request in accordance with the personalized investment recommendation on a user device for the user to select.

8. The method of claim 7, further comprising:

executing, by the processor, the user request in response to a single user input to the user device to select the user prompt, wherein executing the user request comprises automatically submitting at least one order, in accordance with the personalized investment recommendation without requiring further input from the user.

9. The method of claim 1, further comprising:

selecting the personalized investment recommendation for execution; and sharing the personalized investment recommendation with other users to enable review and execution of the selected personalized investment recommendation by the other users.

10. A system for generating personalized investment recommendations, the system comprising:

a user device; and a processor external to and in communication with the user device, the processor is configured to: receive input from a user through the user device, the input comprising at least one of a text prompt or an audio prompt; process the input using a first artificial intelligence (AI) model comprising at least one of a recurrent neural network (RNN), deep RNN (DRNN), Q-learning network (QN), or deep Q-learning network (DQN) to generate extracted information, wherein the first AI model transforms unstructured natural language or audio input into a structured representation comprising identified investment intents, risk parameters, and asset class preferences; generate a plurality of responses using generative AIs with the extracted information as input, wherein the generative AIs are iteratively trained using historical data as training input with training parameters adjusted based on performance feedback, and wherein the iterative training comprises comparing each generative AI's prior outputs against subsequent actual market outcomes to dynamically adjust model weights; connect the plurality of responses to real-time market data and exclusive datasets comprising at least one of credit card transaction volumes, satellite imagery data, GPS-derived foot traffic data, financial analyst opinion data, and shipping or supply chain data to improve quality and relevance of the plurality of responses by identifying discrepancies between the generative AI responses and current real-world conditions reflected in the exclusive datasets, and adjusting the responses to account for identified discrepancies; copy at least some of the plurality of responses and perform modification to the copied responses to prepare for a consistency check; evaluate, using one or more AIs, consistency between the plurality of responses and the modified copied responses; score the plurality of responses based on the consistency evaluation; select a predetermined number of top responses based on the scores to present to the user; and generate a personalized investment recommendation to the user based on the plurality of responses, wherein the generative AIs comprise at least one of generative adversarial networks (GANs), variational auto-encoders (VAEs), autoregressive models, or transformers, and wherein the processor is further configured to perform distributed computing across a plurality of user devices to generate the plurality of responses when resources of the processor are exhausted.

11. The system of claim 10, wherein the processor is configured to generate the personalized investment recommendation by:

evaluate, using a second AI model, the plurality of responses based on at least one of user preferences, financial goals, or risk tolerance of the user in generating the personalized investment recommendation.

12. The system of claim 10, wherein the processor is configured to generate the personalized investment recommendation by:

analyze sentiment information comprising news articles and social media posts to gauge market sentiment and predict potential market trends; and combine the analyzed sentiment information with the plurality of responses to generate the personalized investment recommendation.

13. The system of claim 10, wherein the processor is configured to generate the personalized investment recommendation by:

analyze the plurality of responses in conjunction with tax information of the user to derive set of tax minimizing responses; and generate the personalized investment recommendation from the set of tax minimizing responses.

14. The system of claim 10, wherein the processor is further configured to:

rank a plurality of portfolios in a leaderboard, wherein the plurality of portfolios comprises a portfolio of the user derived based on the personalized investment recommendation and portfolios of other users.

15. The system of claim 10, wherein the processor is further configured to:

perform virtual portfolio simulations using the plurality of responses for scenario testing.

16. The system of claim 10, wherein the processor is further configured to:

display a user prompt to perform a user request in accordance with the personalized investment recommendation on a user device for the user to select.

17. The system of claim 16, wherein the processor is further configured to:

execute the user request in response to a single user input to the user device to select the user prompt, wherein execute the user request comprises automatically submitting at least one order, in accordance with the personalized investment recommendation without requiring further input from the user.

18. The system of claim 10, wherein the processor is further configured to:

receive selection of the personalized investment recommendation for execution from the user; and share the personalized investment recommendation with other users to enable review and execution of the selected personalized investment recommendation by the other users.

* * * * *